United States Patent [19]

Mortus

[11] 4,207,938
[45] Jun. 17, 1980

[54] LOCKNUT

[75] Inventor: Harold J. Mortus, Twinsburg, Ohio

[73] Assignee: The Lamson & Sessions Co., Cleveland, Ohio

[21] Appl. No.: 935,262

[22] Filed: Aug. 21, 1978

[51] Int. Cl.² ............................................. F16B 39/30
[52] U.S. Cl. .................................................. 151/21 B
[58] Field of Search ........................... 151/21 B, 21 R; 10/86 A

[56] References Cited

U.S. PATENT DOCUMENTS

| | | | |
|---|---|---|---|
| 1,903,921 | 4/1933 | Rupf | 10/86 A X |
| 2,452,192 | 10/1948 | Hosking | 151/21 B |
| 2,563,162 | 8/1951 | Eckenbeck et al. | 10/86 A |
| 3,277,942 | 10/1966 | Dwyer | 151/21 B |
| 3,324,920 | 6/1967 | Brown | 10/86 A X |
| 3,456,704 | 7/1969 | Johnson | 10/86 A X |
| 3,460,428 | 8/1969 | Charles | 151/21 B X |
| 3,678,978 | 7/1972 | Davis et al. | 151/21 B |
| 3,747,656 | 7/1973 | Mortus | 151/21 B |

Primary Examiner—Ramon S. Britts

[57] ABSTRACT

An improved locknut has an axially extending central opening with standard thread convolutions which freely engage an externally threaded member and lock thread convolutions which interfere with the threads on the externally threaded member to provide a locking action. The lock thread convolutions have an axial extent which is less than half of the total axial extent of the internal threads on the nut. The lock thread convolutions are formed by making a plurality of indentations in the nut body. Each of these indentations is defined by a continuously curving surface which forms part of a cylindrical plane. Each indentation has continuously curving edges which intersect at a pair of peaks at opposite ends of the indentation. Each indentation also has a height which is less than one-third of the height of a wrenching flat and a width which is less than one-third of the width of a wrenching flat. This enables the number of free running standard thread convolutions on the inside of the nut to be maximized and minimizes galling between the locking thread convolutions and the external thread convolutions.

2 Claims, 7 Drawing Figures

LOCKNUT

BACKGROUND OF THE INVENTION

This invention relates to an improved locknut and more particularly to a locknut having thread convolutions which are formed by making indentations in the body of the locknut.

The concept of forming lock thread convolutions by making indentations in the body of a nut is disclosed in U.S. Pat. No. 3,456,704. In this patent the indentations are relatively large. Thus, the indentations in this known nut have a height which is substantially greater than half of the height of the wrenching flats on the nut. In addition, the indentations have a width which is substantially greater than half of the width of the wrenching flats on the nut.

The relatively large indentations on the nut shown in U.S. Pat. No. 3,456,704 tend to reduce the number of free running standard thread convolutions which can be provided on the nut and promotes abrading of external thread convolutions when the nut is turned onto an externally threaded member. In addition, a relatively high degree of friction may develop between the lock thread convolutions and the externally threaded member. This friction tends to reduce the number of times which the nut can be reused with a suitable locking action.

Other locknuts having indentations to form locking thread convolutions are disclosed in U.S. Pat. Nos. 1,903,921 and 3,678,978. Although the indentations shown in these locknuts are smaller than the indentations utilized in the locknut shown in the aforementioned U.S. Pat. No. 3,456,704, the indentations provided in the locknuts disclosed in these two patents have a generally rectangular configuration and are sharply indented into the side of the lockout. There is also a relatively large deformation of the lock thread convolutions and a relatively large degree of friction between the locking thread convolutions and the standard thread convolutions on an externally threaded member. Although the relatively high degree of friction does provide a substantial initial locking action, the greater the degree of friction the fewer times the nut can provide a suitable locking action without abrading the mating threads on a bolt.

SUMMARY OF THE PRESENT INVENTION

A locknut constructed in accordance with the present invention is provided with lock thread convolutions which are formed by relatively small indentations in the nut. Thus, each of the indentations has a height, measured along a line extending parallel to the central axis of the nut, which is less than one-third of the height of a flat side surface or wrenching flat on the nut. In addition each of the indentations has a width, measured along a line extending between opposite ends of the indentation, which is less than one-third of the width of a flat side surface on the nut. This size relationship between the indentations and the flat side surfaces of the nut is particularly advantageous when the nut is of the low profile type, that is when the flat side surfaces or wrenching flats on the nut have a width which is at least twice as great as their height.

The size relationship between indentations and the flat side surfaces of the nut tends to maximize the number of free running or standard thread convolutions for a particular overall nut height. This promotes the strength of the thread engagement for a given nut height.

The indentations are formed at an angle of 30° or more to the central axis of the nut. In addition, the surface of each indentation is continuously curving and forms a portion of a cylindrical plane. This results in the formation locking portions having a relatively short circumferential extent to reduce galling and/or abrading between the lock thread convolutions and the standard threads of a bolt with which the nut is connected. This enables the locknut to obtain a satisfactory locking action with repeated reuse.

Accordingly, it is the object of this invention to provide a new and improved locknut having a relatively large number of free running or standard thread convolutions and lock thread convolutions which have a configuration which tends to minimize galling and/or abrading between the lock thread convolutions and an externally threaded member to thereby enable the locknut to obtain a satisfactory locking action during repeated reuse.

Another object of this invention is to provide a new and improved locknut in accordance with the preceding object and wherein lock thread forming indentations have a height which is less than one-third of the height of the flat side surfaces of the locknut and an width which is less than one-third of the width of a flat side surfaces of the locknut.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
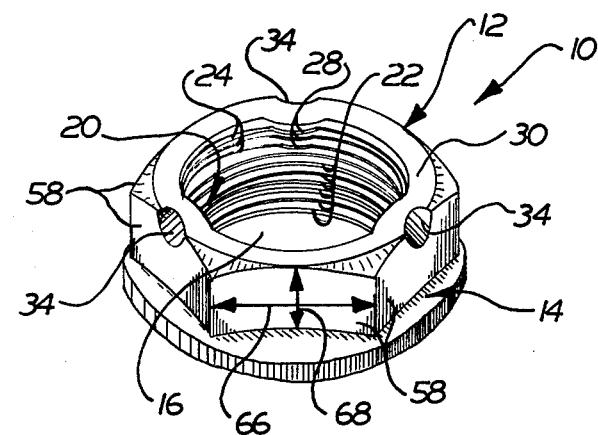
FIG. 1 is a pictorial illustration of a locknut constructed in accordance with the present invention.

A Locknut 10 constructed in accordance with the present invention is illustrated in FIG. 1. The locknut 10 has a generally hexagonal body 12 and a circular bottom flange or base 14. An internally threaded cylindrical opening 16 extends through the center of the nut 10. A screw thread 20 is formed in a side wall of the opening 16. The screw thread 20 include a relatively large number of standard thread convolutions 22 in the lower portion of the opening 16 adjacent to the base 14. The standard thread convolutions 22 freely engage standard thread convolutions on an externally threaded member or bolt.

In addition, the screw head 20 includes a relatively small number of lock thread convolutions 24 formed in the upper portion of the opening 16. The lock thread convolutions 24 are formed as a continuation of the standard thread convolutions 22. Each of the lock thread convolutions 24 has a plurality of locking sections 28 which extend radially inwardly of the standard thread convolutions 22. The locking sections 28 interfere with the flanks and roots of the external thread convolutions to thereby obtain a locking action between the internal thread convolutions on the nut and the external thread convolutions.

Figure 3:
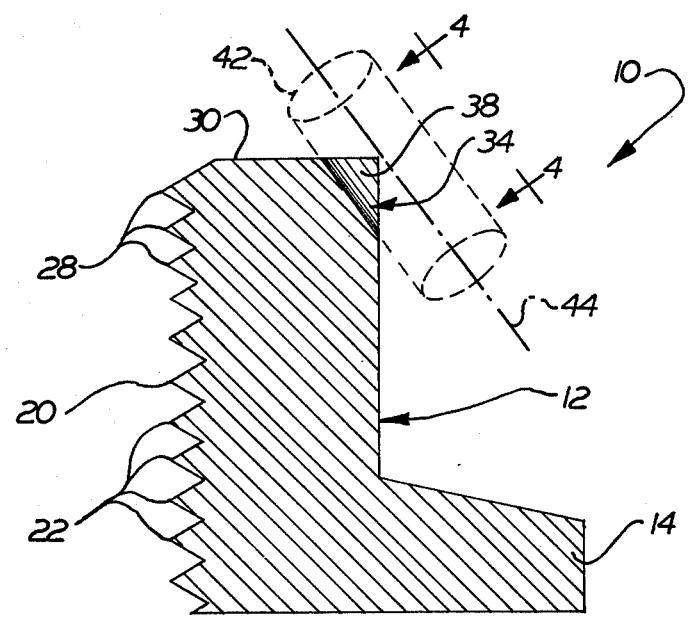
FIG. 3 is a sectional view, taken along the line 3—3 of FIG. 2, illustrating the relationship between an indentation and internal thread convolutions formed in the locknut.
Figure 4:
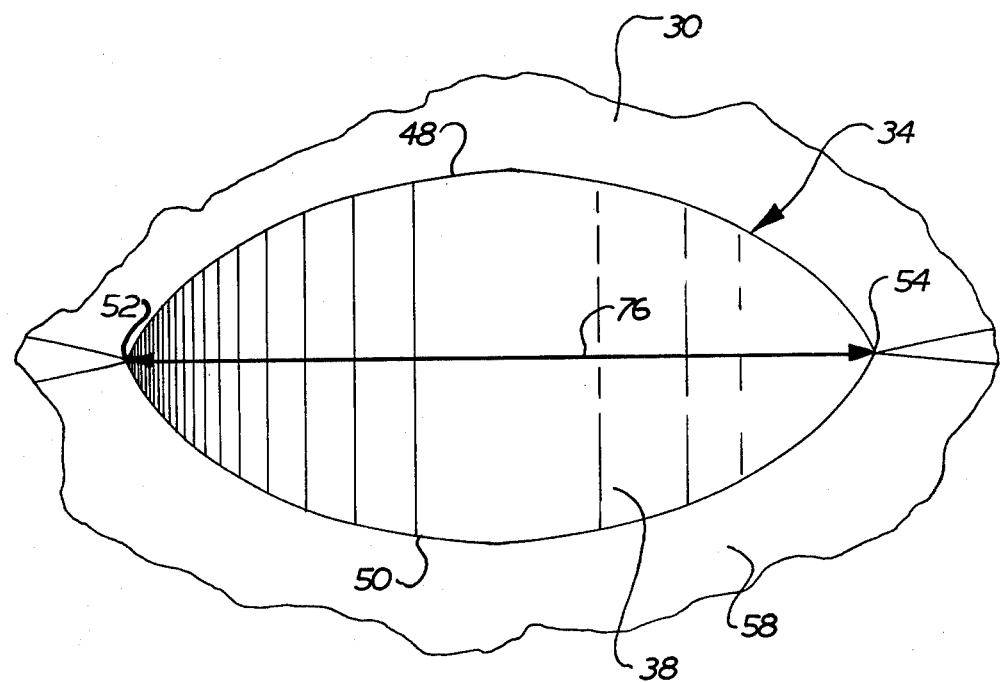
FIG. 4 is an enlarged plan view, taken along the line 4—4 of FIG. 3, further illustrating the configuration of the indentation.

To make the nut 10, the opening 16 is first threaded with a continuous standard thread. The lock thread convolutions 24 are then formed by pressing inwardly against the outside of the nut 10. This deforms the standard thread convolutions adjacent to the upper or crown end portion 30 of the nut. The pressure against the outside of the nut 10 results in the formation of a plurality of identical indentations 34 (see FIGS. 2, 3 and 4) in the nut.

Each of of the indentations 34 has a continuously curving concave surface area 38, that is a surface area which is free of stress including discontinuities. The surface area 38 of each indentation 34 forms a portion of a cylinder in a manner which has been illustrated schematically in FIG. 3. Thus, the surface 38 forms a portion of a cylinder 42 which has been indicated in dash lines in FIG. 3.

The cylinder 42 has a longitudinally extending central axis 44 which intersects the central axis of the opening 16 in the locknut at an angle of 30° or more. By providing an angle of at least 30° between the surface 38 and the central axis of the locknut 10, the indentation 34 is provided with a relatively short height measured along a line extending parallel to the central axis of the nut body 12. This enables the indentation 34 to be utilized on low profile nuts, that is on nuts having flat outside surfaces or wrenching flats which have a width which is at least twice as great as the height of the flats.

Each of the indentations 34 is sized so as to maximize the number of standard thread convolutions 22 provided in the nut 10. Thus, in one specific embodiment of the invention, there were a total of eight standard thread convolutions 22 and only three locking thread convolutions 28. Of course, the number of standard and locking thread convolutions will vary with the size of a nut. However, in order to provide for engagement of a nut with an externally threaded member, a locknut having a construction in accordance with the present invention will have at least two standard or free running thread convolutions. Although the number of free running thread convolutions may vary, it is preferred to have the number of lock thread convolutions 24 be less than half of the total number of thread convolutions formed in the opening 16.

Each of the indentations or recesses 34 has a pair of continuously curving edges 48 and 50 (see FIGS. 2 and 4) which intersect at peaks 52 and 54 disposed at opposite end portions of the indentation. The edges 48 and 50 curve outwardly away from each other so that midway between the peaks 52 and 54 the edges 48 and 50 are separated by a substantial distance (see FIG. 4). The edge 50 is formed at the intersection between the indentation or recess 34 and a flat side surface or wrenching flat 58 of the locknut 10. The edge 48 is formed at the intersection between the recess 34 and the crown end portion 30 of the nut.

The nut 10 is of the low profile type. The nut 10 has six flat side surfaces or wrenching flats 58 which are arranged in a hexagonal array about the body of the nut. The width of each flat side surface 58 is measured between axially extending edges 62 and 64 (see FIG. 2) of the flat side surface along a line which extends perpendicular to the central axis of the opening 16. This line has been indicated by the arrow 66 in FIG. 1. Similarly, the height of each flat side surface 58 is measured at the center of the flat between an intersection with the flange 14 and the crown 30 along a line indicated by the arrow 68 in FIG. 1. Since the nut 10 is of the low profile type, the width of the flat 58 is at least twice as great as the height of the flat.

Figure 2:
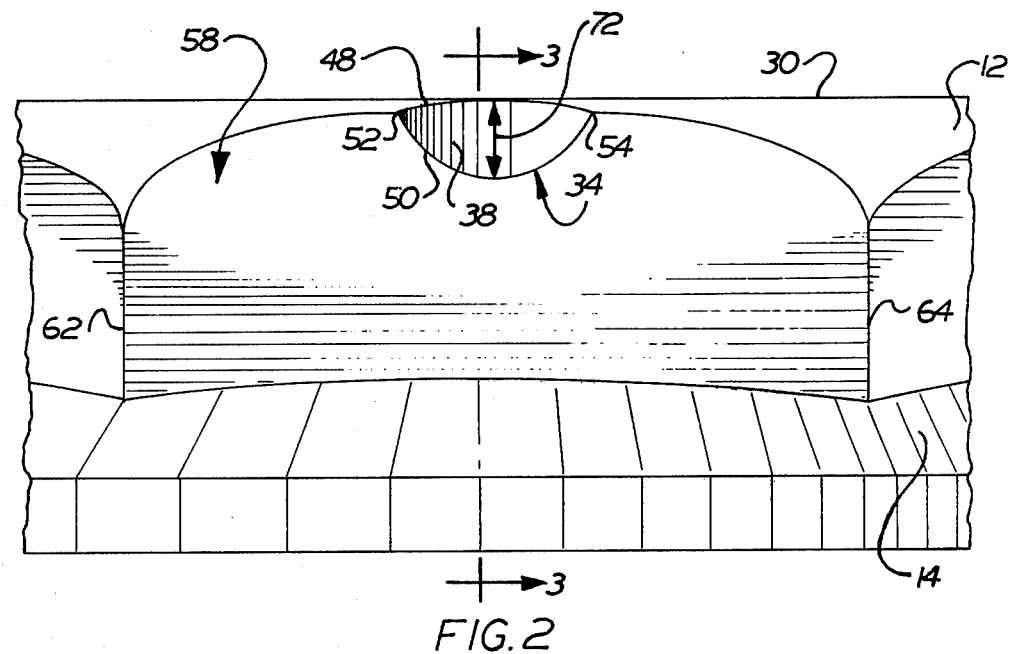
FIG. 2 is an enlarged fragmentary view of a portion of the locknut of FIG. 1 and illustrating the relationship between an indentation formed in the locknut and a flat side surface of the locknut.

In order to maximize the number of standard thread convolutions or free running turns 22, the indentation 34 has a relatively small height which is measured along a straight line indicated at 72 in FIG. 2. The line 72 along which the height of the indentation 34 is measured is disposed at the center of the indentation and extends parallel to the central axis of the opening 16. Thus, the height of the indentation 34 is measured in the vertical plane of the flat side surface 58 between the lowest portion of the edge 50 and the horizontal plane of the highest portion of the edge 48.

The width of the indentation 34 is measured along a straight line between the peaks 52 and 54 of the indentation. This straight line has been indicated at 76 in FIG. 4. It should be noted that the straight line 76 is spaced apart from the arcuately curving concave surface 38 at the center of the recess 34.

The identical indentations 34 have abrupt radii which result in formation of the locking thread convolutions 24 in such a manner as to minimize galling and/or abrading with standard thread convolutions on an externally threaded member. In addition, the abrupt radii of the indentations 34 enables a relatively large number of standard thread convolutions 22 to be formed at the lower end of the nut. Thus, the each of the indentations 34 has a height, as measured along the line 72 (FIG. 2), which is less than one-third of the height of the associated flat 58, as measured along the line 68 of FIG. 1.

In order to provide an abrupt radius on the indentations 34, the indentations have a relatively small radius of curvature. This results in the indentations 34 having a length, as measured along the line 76 of FIG. 4, which is less than one-third of the length of the flat side surface 58 as measured along the line 66 of FIG. 1. By reducing the length of the indentations 34, the circumferential extent of the locking thread sections 28 is reduced. Reducing the circumferential extent of the locking thread convolutions 28 reduces the area of frictional engagement between the locking thread convolutions and the external thread convolutions on a bolt or other member. This reduces heat build-up during removal of the nut. In addition, reducing the circumferential extent of the locking thread sections 28 reduces abrading and galling between the lock thread convolutions and the mating external thread convolutions. These factors all contribute to the reusability of the locknut 10.

Tests were conducted on a one and three quarter inch-12 locknut having three indentations 34 with a 0.250 inch radius of curvature to determine the locking action which is obtained after the nut has been reused a number of times. The locking action obtained with ten different low profile nuts which were installed on an externally inserted number and then removed five times is shown in the chart below. The IFI standard for a locknut is shown at the end of the chart.

| Nut No. | First Installation | First Removal Inch lbs. | | Fifth Removal Inch lbs. | |
|---|---|---|---|---|---|
| | | High | Low | High | Low |
| 1 | 87 Ft.-Lb. | 600 | 480 | 420 | 348 |
| 2 | 109 Ft.-Lb. | 720 | 600 | 504 | 420 |
| 3 | 100 Ft.-Lb. | 780 | 660 | 540 | 420 |
| 4 | 90 Ft.-Lb. | 612 | 504 | 444 | 338 |
| 5 | 96 Ft.-Lb. | 660 | 588 | 576 | 468 |
| 6 | 120 Ft.-Lb. | 840 | 708 | 744 | 600 |
| 7 | 102 Ft.-Lb. | 732 | 612 | 408 | 288 |
| 8 | 94 Ft.-Lb. | 780 | 660 | 672 | 552 |
| 9 | 85 Ft.-Lb. | 492 | 384 | 312 | 228 |
| 10 | 95 Ft.-Lb. | 624 | 540 | 420 | 444 |
| IFI | 165 Ft. lbs. (Max.) | 180 | 90 (Min.) | 120 | 60 (Min.) |

It should be noted that the removal torques for all ten nuts substantially exceed the IFI specifications for minimal torques. Each of the locknuts had between 2½ and 3¼ free turning or standard thread convolutions. The locknuts all had three indentations 34 having a height which is less than one third the height of a wrenching flat 58 and a width which is less than one third of the width of a wrenching flat. It is believed that it is apparent that the use of the indentations 34 contributed to the improved locking action and reuseability of the locknuts.

Figure 5:
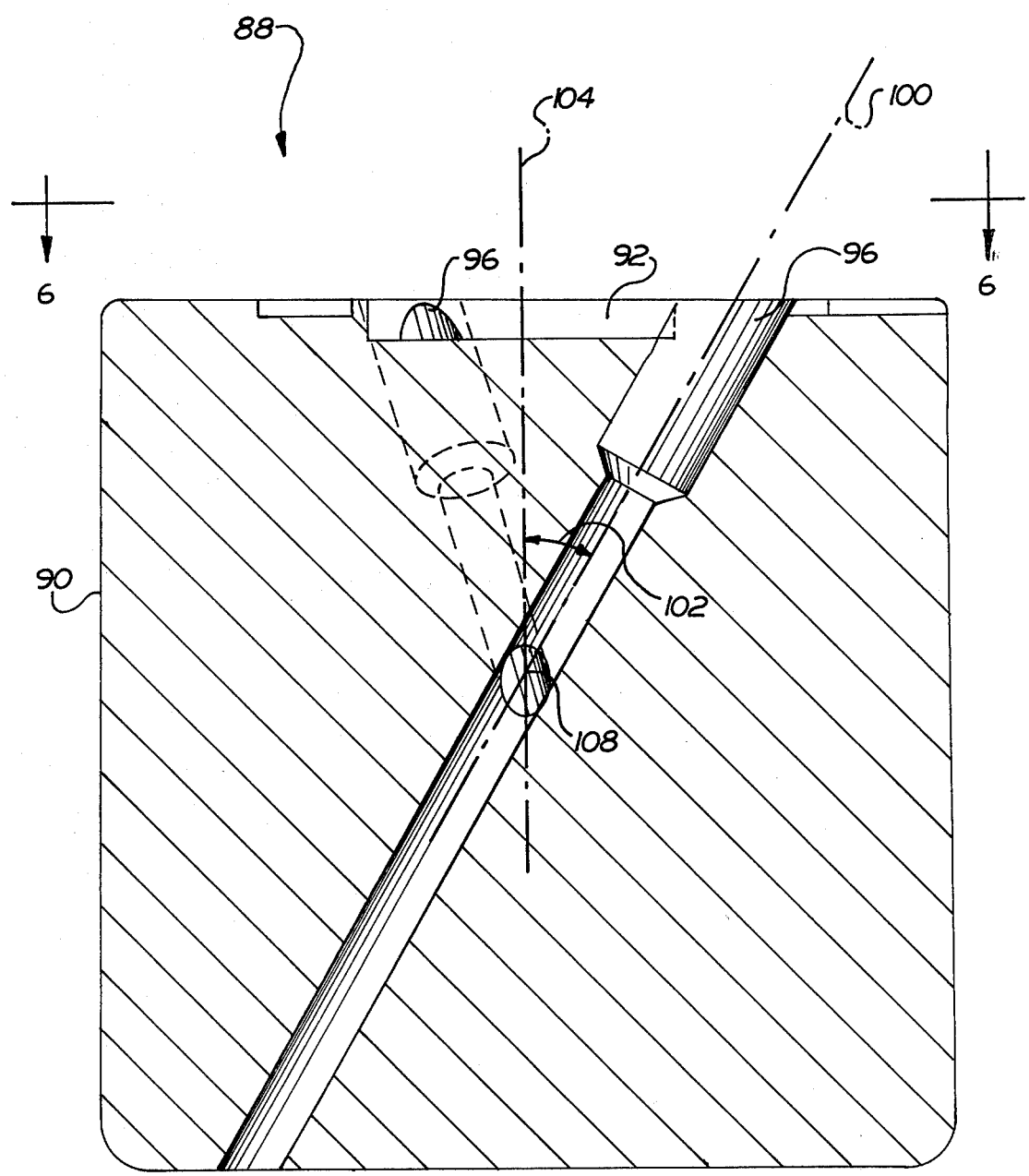
FIG. 5 is a sectional view illustrating the construction of a header utilized to form the indentations in the locknut of FIG. 1.
Figure 6:
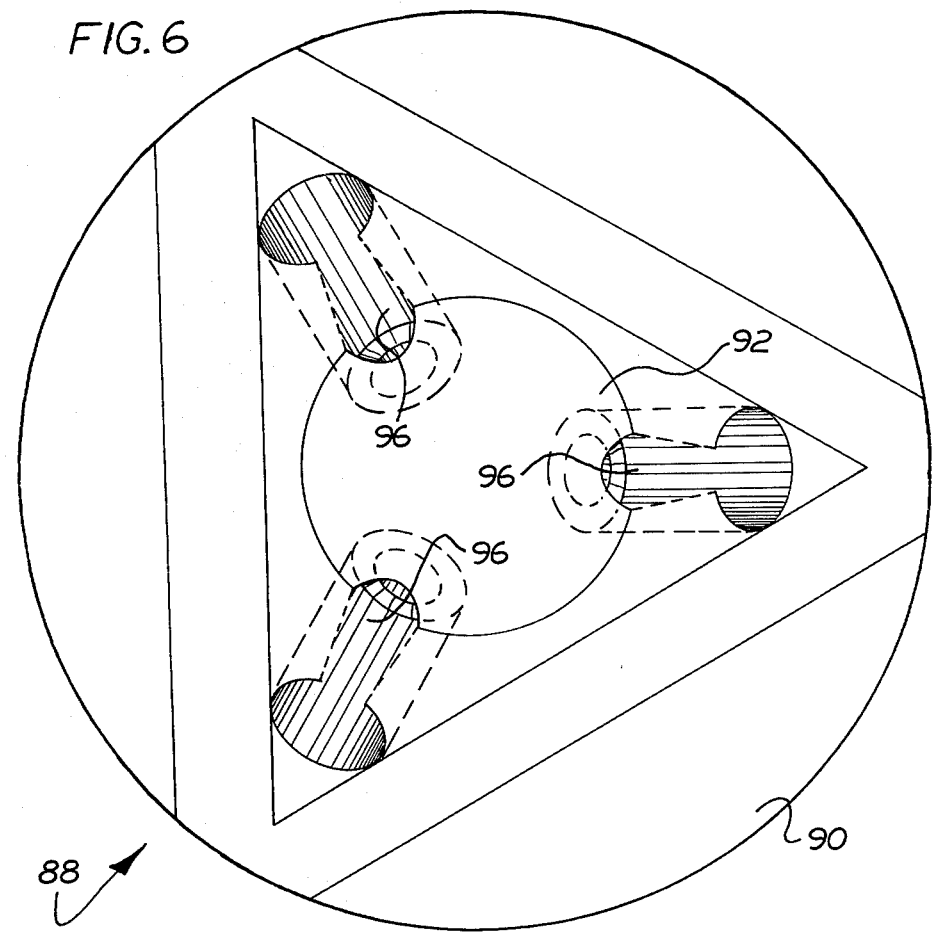
FIG. 6 is a plan view, taken along the line 6—6 of FIG. 5, further illustrating the construction of the header.

The tooling for forming the indentations 34 of the locknut 10 is shown in FIGS. 5 and 6. The tooling includes a header or a die assembly 88 having a base 90 with a recess 92 having the same configuration as the locknut 10. Three cylindrical pins 96 are disposed in the base 90. The side surfaces of the pins 96 extend into the recess 92.

To manufacture the nut 10, standard thread convolutions are formed throughout the opening 16 in the nut. The nut is then placed in the die cavity 92 and pressure is applied against the nut. This forces the nut body 12 against the pins 96 to form the recesses 34. The cylindrical pins 96 are received in similarly shaped openings in the base 90 and can be replaced when necessary if they become worn due to extended use.

The central axes 100 of the pins 96 all extend at the same acute angle, indicated at 102 in FIG. 5, to the central axis 104 of the recess 92. As previously indicated, the angle 102 is at least 30 degrees. The pins 96 are oriented so that their central axes 100 intersect each other and the central axis 104 fo the recess 92 at a point which has been indicated at 108 in FIG. 5.

In forming the ten low profile locknuts which were tested to obtain the foregoing data, each of the pins 96 had an outside diameter of 0.500 inches.

Figure 7:
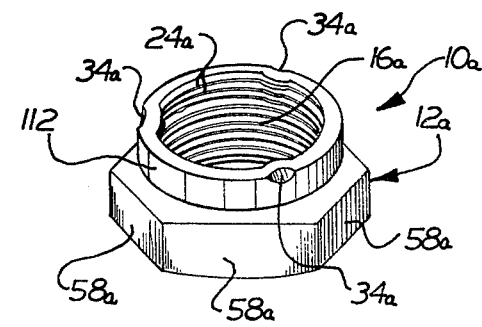
FIG. 7 is a pictorial illustration of a second embodiment of the invention in which the locknut is provided with a collar.

In the embodiment of the invention illustrated in FIG. 1 the indentations 34 are formed in the flat side surfaces 58 of the nut body 12. However, it is contemplated that the indentations 34 may be associated with a nut of the collar type as shown in FIG. 7. When the indentations 34 are utilized in association with a collar nut, the indentations do not have to be aligned in any particular orientation with the flat side surfaces of the nut. This facilitates manufacture of the collar type locknut since the locknut does not have to be oriented relative to a die or header assembly. Since the embodiment of the invention illustrated in FIG. 7 is generally similar to the embodiment of the invention shown in FIG. 1., similar numerals will be utilized to designate similar components, the suffix letter "a" being associated with FIG. 7 to avoid confusion.

Locknut 10a has a body 12a which includes a main section in which flat side surfaces 58a are formed and a collar section 112. A plurality of indentations 34a are formed in the collar 112. The indentations 34a have the same configuration as the indentations 34 of FIGS. 1 through 4.

Although the indentations 34a disposed in the collar 112 and are spaced from the flat side surfaces 58a, they have the same size relationship to the flat side surfaces 58a as do the indentations 34 to the flat side surfaces 58. Thus, the indentations 34a have a height which is measured along a line which extends parallel to a central axis of a threaded opening 16a in a nut body and which is less than one-third of the height of the flat side surfaces 58a. Similarly, the indentations 34a have a length, measured between peaks at opposite ends of the indentation, which is less than one-third of the length of the flat side surfaces 58a. This relationship between the sizes of the indentations 34a and the size of the flat side surfaces 58a provides lock thread convolutions 24a having the same locking and reusability characteristics as the lock thread convolutions 24 of FIGS. 1-4.

In view of the foregoing description it is apparent that a locknut 10 constructed in accordance with the present invention is provided with lock thread convolutions 24 which are formed by relatively small indentations 34 in the nut. Thus, each of the indentations 34 has a height, measured along a line 72 extending parallel to the central axis of the nut, which is less than one-third of the height of a flat side surface 58 of the nut. In addition each of the indentations 34 has a width, measured along the line 76 extending between opposite ends of the indentation, which is less than one-third of the width of a flat side surface 58 of the nut. This size relationship between the indentations 34 and the flat side surfaces 58 of the nut 10 is particularly advantageous when the nut is of the low profile type, that is when the flat side surfaces 58 of the nut have a width which is at least twice as great as their height.

The size relationship between indentations 34 and the flat side surfaces 58 of the nut 10 tends to maximize the number of free running or standard thread convolutions 22 for a particular overall nut height. This promotes the strength of the thread engagement for a given nut height.

The indentations 34 are formed at an angle of 30° or more to the central axis of the nut. In addition, the surface 38 of each indentation 34 is continuously curving and forms a portion of cylinder 42. This results in the formation locking portions 28 having a relatively short circumferential extent to reduce galling and/or abrading between the locking thread convolutions 24 and the standard threads of a bolt with which the nut is connected. This enables the locknut 10 to obtain a satisfactory locking action with repeated reuses.

Having described specific preferred embodiments of the invention, the following is claimed:

1. A lock nut for cooperating with standard thread convolutions on an externally threaded member, said lock nut comprising a metal nut body having a base, a curved crown end portion, and an axial opening extending through the nut body between said base and said crown end portion, a screw thread formed in a sidewall of said opening, said screw thread including a plurality of standard thread convolutions and a plurality of lock thread convolutions, said lock thread convolutions being disposed adjacent to the crown end portion of the nut body, each of said lock thread convolutions including a plurality of lock sections which project radially inwardly of the standard thread convolutions to interfere with the thread convolutions on the externally threaded member to thereby provide a locking action between the lock thread convolutions and the standard thread convolutions on the externally threaded member, said nut body having a plurality of flat side surfaces disposed in a hexagonal array about the nut body and intersecting the crown end portion of the nut body, each of said flat side surfaces having a height which is measured along a line extending parallel to a central axis of the opening extending through the nut body, each of said flat side surfaces having a width which is measured along a line extending perpendicular to the central axis of the opening extending through the nut body and which is at least twice as great as the height of the flat side surface, and a plurality of indentations formed in said side surfaces of the nut body at locations radially outwardly of said locking sections, each of said indentations being defined by continuously curving surface having a pair of continuously curving edges which intersect at peaked end portions of the indentations, a first one of the pair of continuously curving edges of each of said indentations being formed at a continuously curving line of intersection between the crown end portion of the nut body and the continuously curving surface of the indentation, a second one of the pair of continuously curving edges of each of said indentations being formed at a continuously curving line of intersection between a flat side surface of the nut body and the continuously curving surface of the indentation, said first and second continuously curving edges of each of said indentations being spaced a maximum distance apart at their central portions which are disposed midway between the peaked end portions of the indentation, each of said indentations having a height which is measured along a line disposed in the plane of a flat side surface and extending parallel to the central axis of the opening, the height of each of said indentations being less than one third of the height of one of said flat side surfaces, each of said indentations having a width which is measured along a line extending between the peaked end portions of the indentation and which is less than one third of the width of one of said flat side surfaces, the continuously curving surface of each of said indentations forming a portion of a cylinder which has a longitudinally extending central axis, the longitudinally extending central axis of each cylindrical indentation surface intersecting the central axis of said opening extending through the nut body at a point disposed outwardly of the crown end portion of the nut body in a direction away from the nut body, the longitudinally extending central axis of each cylindrical indentation surface intersecting the central axis of said opening through the nut body at the same angle which has a magnitude of at least thirty degrees to the central axis of the opening.

2. A lock nut for cooperating with standard thread convolutions on an externally threaded member, said lock nut comprising a metal nut body having a main body section and an annular collar which extends axially outwardly from one end portion of said main body section, an axially extending opening through said main body section and said annular collar, a screw thread formed in a sidewall of said opening, said screw thread including a plurality of standard thread convolutions and a plurality of lock thread convolutions, said lock thread convolutions being disposed in said collar, each of said lock thread convolutions including a plurality of lock sections which project radially inwardly of the standard thread convolutions to interfere with the thread convolutions on the externally threaded member to thereby provide a locking action between the lock thread convolutions and the standard thread convolutions on the externally threaded member, said main body section having a plurality of flat side surfaces disposed in a hexagonal array about the main body section, each of said flat side surfaces having a height which is measured along a line extending parallel to a central axis of the opening extending through the nut body, each of said flat side surfaces having a width which is measured along a line extending perpendicular to the central axis of the opening extending through the nut body and which is at least twice as great as the height of the flat side surface, said annular collar having a generally cylindrical outer side surface and a flat annular end surface, and a plurality of indentations formed in the annular collar at locations radially outwardly of said locking sections, each of said indentations being defined by a continuously curving surface having a pair of continuously curving edges which intersect at peaked end portions of the indentation and which are spaced apart at a central portion of the indentation, a first one of the pair of continuously curving edges of each of said indentations being formed at a continuously curving line of intersection between the flat annular end surface of said collar and the continuously curving surface of the indentation, a second one of the pair of continuously curving edges of each of said indentations being formed at a continuously curving line of intersection between the outer side surface of the collar and the continuously curving surface of the indentation, said continuously curving edges of each of said indentations being spaced a maximum distance apart at their central portions which are disposed midway between the peaked end portions of the indentation, each of said indentations having a height which is measured along a line disposed in the plane of the outer side surface of the collar and extending parallel to the central axis of the opening and which is less than one third of the height of one of said flat side surfaces, each of said indentations having a width which is measured along a line extending between the peaked end portions of the indentation and which is less than one third of the width of some of said flat side surfaces, the continuously curving surface of each of said indentations forming a portion of a cylinder which has a longitudinally extending central axis, the longitudinally extending central axis of each cylindrical indentation surface intersecting the central axis of said opening extending through the nut body at a point disposed outwardly of the annular end surface of said collar in a direction away from the main body section, the longitudinally extending central axis of each indentation surface intersecting the central axis of said opening through the nut body at the same angle which has a magnitude of at least thirty degrees to the central axis of the opening.

* * * * *

UNITED STATES PATENT AND TRADEMARK OFFICE
CERTIFICATE OF CORRECTION

PATENT NO. : 4,207,938
DATED : June 17, 1980
INVENTOR(S) : Harold J. Mortus

It is certified that error appears in the above-identified patent and that said Letters Patent are hereby corrected as shown below:

Column 8, line 53, change "some" to --one--.

Signed and Sealed this

Ninth Day of September 1980

[SEAL]

Attest:

SIDNEY A. DIAMOND

Attesting Officer

Commissioner of Patents and Trademarks